United States Patent
Blodig

(10) Patent No.: US 9,725,627 B2
(45) Date of Patent: Aug. 8, 2017

(54) PROTECTIVE ELEMENTS MADE OF POLYOLEFIN HOT-MELT ADHESIVES

(71) Applicant: HENKEL AG & CO. KGAA, Duesseldorf (DE)

(72) Inventor: Claudia Blodig, Bopfingen (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 398 days.

(21) Appl. No.: 14/597,577

(22) Filed: Jan. 15, 2015

(65) Prior Publication Data

US 2015/0125693 A1 May 7, 2015

Related U.S. Application Data

(63) Continuation of application No. PCT/EP2013/065044, filed on Jul. 17, 2013.

(30) Foreign Application Priority Data

Jul. 17, 2012 (DE) .................. 10 2012 212 499

(51) Int. Cl.

| | | |
|---|---|---|
| *C09J 123/30* | (2006.01) | |
| *B29C 47/10* | (2006.01) | |
| *B29C 47/92* | (2006.01) | |
| *C09J 123/10* | (2006.01) | |
| *C08L 23/10* | (2006.01) | |
| *B29C 47/82* | (2006.01) | |
| *C08F 8/50* | (2006.01) | |
| *C08K 5/14* | (2006.01) | |
| *B29B 7/42* | (2006.01) | |

(52) U.S. Cl.
CPC ............ *C09J 123/30* (2013.01); *B29C 47/10* (2013.01); *B29C 47/827* (2013.01); *B29C 47/92* (2013.01); *C08F 8/50* (2013.01); *C08L 23/10* (2013.01); *C09J 123/10* (2013.01); *B29B 7/421* (2013.01); *B29C 2947/92704* (2013.01); *C08F 2810/10* (2013.01); *C08K 5/14* (2013.01); *C09J 2201/61* (2013.01); *Y10T 428/269* (2015.01); *Y10T 428/2826* (2015.01)

(58) Field of Classification Search
CPC .... C09J 123/30; C09J 123/40; C09J 2201/61; B29C 47/10; B29C 47/827; B29C 47/92; B29C 2947/92704; C08F 8/50; C08F 2810/10; C08L 23/10; Y10T 428/269; Y10T 428/2826; B29B 7/421; C08K 5/14

See application file for complete search history.

(56) References Cited

U.S. PATENT DOCUMENTS

| | | | |
|---|---|---|---|
| 3,862,265 A | 1/1975 | Steinkamp et al. | |
| 4,528,312 A | 7/1985 | Edwards | |
| 4,624,993 A * | 11/1986 | Upadhyaya | C08F 8/50 525/333.8 |
| 5,330,568 A | 7/1994 | Park et al. | |
| 6,486,246 B1 | 11/2002 | Vion | |
| 2011/0112229 A1 * | 5/2011 | Nagaoka | C09D 5/002 524/186 |

FOREIGN PATENT DOCUMENTS

| | | |
|---|---|---|
| DE | 29705428 U1 | 5/1997 |
| WO | 0146277 A2 | 6/2001 |
| WO | 2012013699 A1 | 2/2012 |

OTHER PUBLICATIONS http://www.adhesivesmag.com/articles/86610-low-molecular-weight-polyolefins-for-hot-melt-adhesives, Apr. 1, 2007.*

* cited by examiner

*Primary Examiner* — Nathan M Nutter
(74) *Attorney, Agent, or Firm* — Sun Hee Lehmann

(57) ABSTRACT

The use of a hot-melt adhesive as a protective element for objects is disclosed, wherein the hot-melt adhesive contains over 80 wt. % of at least one modified polyolefin copolymer produced from a high-molecular-weight polyolefin copolymer by thermomechanical degradation of the polymer under shear stress and/or heating, wherein the viscosity of the copolymer is reduced, and up to 20 wt. % of additives and auxiliary substances, wherein the adhesive has a softening point from 70 to 150° C.

9 Claims, No Drawings

PROTECTIVE ELEMENTS MADE OF POLYOLEFIN HOT-MELT ADHESIVES

FIELD OF THE INVENTION

The present invention relates to a method for applying protective elements made from polyolefin hot-melt adhesives to for example ceramic objects. The invention also relates to adhesively bonded moldings produced from polyolefin hot-melt adhesives.

BACKGROUND OF THE INVENTION

Protective layers for mass-produced objects have to satisfy various requirements. Firstly they should be easy to apply to the objects and should not slip during transport. Furthermore, these protective layers need to be easily removed again before the objects undergo further processing. It is moreover advantageous if a rapid application on the corresponding regions of the surface is possible. From the use for mass-produced articles it follows that a low-cost raw material base is advantageous.

WO 2001/46277 discloses a method for producing an adhesive composition containing a degraded ethylene/propylene copolymer, the degradation taking place by thermomechanical stressing of a starting polymer in the presence of a radical former. A further polymer can be added to the degraded ethylene/propylene copolymer before or after it is produced, in order to obtain polymer blends.

WO 2012/013699 describes a method for producing a degraded polyolefin copolymer with an extruder. A specific range of properties of the adhesive and a use are not disclosed.

DE 29705428 describes roofing tiles having a protective layer to prevent damage during transport. The protected regions are the surfaces of the roofing tile which come into contact with other tiles when they are stacked. This protective layer is intended to absorb the vibrations that occur during transport.

The protection of pan tiles with spacers made from plastics is already known. For example, foam parts are placed between the objects to be stacked. These can be fixed by the weight of the other objects, for example. On the other hand, these parts are also provided with a separately applied adhesive coating to prevent them from slipping. The spacers can then be fixed. For example, polystyrene moldings can be used in this way. It is moreover known that polyamide layers can also be used as spacers. These can also be applied directly from the melt and then adhere to the surfaces to be adhesively bonded.

A disadvantage of such methods, however, is that firstly an adequate fixing of the moldings to the objects has to be ensured, while on the other hand these protective layers must be completely removable at least from the visible surfaces of the substrates. A good adhesive strength makes a residue-free separation from the surface very difficult. These materials should have good mechanical stability to prevent them from disintegrating during transport and removal.

SUMMARY OF THE INVENTION

The object of the present invention is therefore to provide a method for coating an object with a protective element, wherein the protective element can be applied from the melt. It is moreover necessary for the adhesive as a protective element to have an adhesion which allows for fixing to a substrate but which on the other hand enables the protective element to be removed from the support substrate. No residues should remain on the substrate. These adhesives should set quickly to allow for uninterrupted further processing and to satisfy the function as a spacer or protective element.

The object is achieved by the use of a hot-melt adhesive for coating objects, wherein the hot-melt adhesive contains at least 80 wt. % of at least one modified polyolefin copolymer produced from a high-molecular-weight polyolefin copolymer, preferably a polypropylene (co)polymer, by thermomechanical degradation of the polymer under shear stress and/or heating, wherein the viscosity of the modified polyolefin copolymer is reduced, and up to 20 wt. % of additives and auxiliary substances, wherein the adhesive has a softening point from 70 to 150° C., and preferably an ultimate elongation over 10%.

The invention further relates to a protective element produced from hot-melt adhesives made from modified polyolefin copolymers, said protective element being designed as a bondable molding and being used as protection. The invention relates moreover to an object provided with a protective element composed according to the invention.

Objects which are inherently sensitive or have mechanically sensitive surfaces are suitable as substrates which can be provided with the layers according to the invention. Ceramic substrates in particular can be coated. Ceramic substrates are understood to be ceramics, glass, concrete, stone, clay and similar materials. These can be untreated, but they can also be coated, for example with layers of paint, layer of enamel or glazes as a color-imparting or sealing coating. Examples are ceramic objects such as tiles, household chinaware, sanitary ceramics; stone, such as natural stone slabs; concrete/clay objects, such as concrete slabs, roofing tiles, clay pipes. In principle these are hard and strong, but they can be damaged by a sudden impact stress, on the edges for example. However, other substrates too can be provided with a coating, such as painted, coated chipboard or plastic substrates; metal objects such as pipes, cans, barrels or vessels.

A molding or protective element is understood to refer to elements or layers made from a hot-melt adhesive, which can be applied to the surface of an object to be protected, a substrate. These elements have a thickness such that the protective element or protective layer can serve as protection for the object. The thickness is up to 2 cm, for example. The protective element can serve as a spacer between the various objects. The moldings have limited expansion, so complete coatings should not be used. They can take the form of a dot, area, bead or network. The elements or layers should be applied in particular to parts of the surfaces of the objects which during transport can come into contact with similar or different objects. The protective element can preferably be applied by coating the objects with the hot-melt adhesive according to the invention.

Hot-melt adhesives, which can be produced from polyolefins, are suitable as the material of the moldings or layer (protective element). These are selected such that they can be applied at elevated temperature as a melt but set on cooling, such that a stable molding/a protective element is obtained within a short time. Through the choice of polymers it can be ensured that elastic layers are obtained. Furthermore, the composition should be chosen such that the adhesive adheres to the substrates but in the solid state this layer can be detached from the surface without residue.

DETAILED DESCRIPTION OF THE INVENTION

A hot-melt adhesive that is suitable according to the invention contains a copolymer based on degraded and modified polyolefins (modified olefin copolymer). This can be produced from high-molecular-weight starting polymers known per se. According to the invention, however, it is necessary for the starting polymer to be degraded to the suitable modified olefin copolymer by a thermomechanical process. Commercially available high-molecular-weight polyolefin copolymers, for example, preferably polypropylene (co)polymers, made from propylene and ethylene, from propylene and butylene, or also from butylene and ethylene or also from propylene and hexene, or terpolymers additionally containing further comonomers such as C4-C20 α-olefins, are suitable as the starting polymer. Polypropylene (co)polymers made from propylene and ethylene, from propylene and butylene or also from butylene and ethylene, and the cited terpolymers are preferably suitable as starting polymers. Mixtures of different starting polymers can also be used. The proportion of monomers can be varied within a broad range, but it is convenient if less than 50% C2 monomer units are included. The corresponding starting polymers have a high molecular weight, a high melting point and a low melt flow index (MFI), a high viscosity and are difficult to apply. Moreover, they usually have no adhesive properties when an extruded bead is cooled. For that reason they are not suitable for use as an adhesive. Usually, they are not rubber-like polymers.

The proportion of propylene in the polypropylene (co) polymer as the starting polymer is for example preferably between 50 and 98 wt. %, in particular between 60 and 95 wt. %, relative in each case to the total weight of the polypropylene (co)polymer. The content of ethylene, butylene or other comonomers is for example between 2 and 50 wt. % and particularly preferably between 5 and 20 wt. %, relative in each case to the total weight of the polypropylene (co)polymer. Suitable polybutylene (co)polymers should likewise have a corresponding ethylene content. (Co)polymers having the aforementioned proportions by weight of ethylene can be effectively converted into the corresponding degradation products.

The starting polymer preferably has a weight-average molecular weight (Mw) from 100,000 g/mol to 300,000 g/mol (weight-average molecular weight, Mw, determinable by GPC). Moreover, a starting polymer preferably has an MFI below 50 g/10 min, in particular from 0.1 to 50 g/10 min (DIN ISO 1133, 230° C., 2.16 kg). The Brookfield viscosity should preferably be very high. It is preferably above 100,000 mPas at 200° C. (according to EN ISO 2555), in particular above 300,000 mPas. Such polymers can be readily processed in the method described.

In a preferred embodiment a mixture of at least two, preferably exactly two, different starting (co)polymers is used. At least one C3-based copolymer and another of the aforementioned starting polymers is preferably included. The C3-based copolymer is preferably a copolymer containing more than 70 mol %, relative to the total amount of monomers used, of propylene incorporated by polymerization and containing as the second monomer preferably a C2 to C20 α-olefin, in particular a C2 to C6 α-olefin, most particularly preferably ethylene, 1-butylene or 1-hexene incorporated by polymerization. In addition to the C3-based copolymer the mixture preferably contains a terpolymer containing preferably at least 80 mol %, relative to the total amount of monomers used, of propylene, and the further monomers are selected in particular from the group of C2 to C20 α-olefins, preferably C2 to C6 α-olefins, most particularly preferably ethylene, 1-butylene and 1-hexene. A corresponding mixture is particularly advantageous in regard to processing and subsequent adhesion of the protective elements to the substrate.

Within the meaning of the present invention the term thermomechanical degradation is understood to be the degradation process which occurs in an extruder under exposure to heat and/or shear stress, wherein polymer chain length-reducing and molecular weight-reducing degradation processes of the polyolefin copolymers, preferably polypropylene (co)polymers, are performed. Within the meaning of the present invention a modified polyolefin copolymer, the modified olefin copolymer, is understood to be a polymer which is produced in an extruder by thermomechanical degradation, starting from a starting polymer.

Single-screw, twin-screw or planetary extruders, for example, are used as suitable extruders. A suitable extruder can comprise a housing with a feed side and a delivery side, wherein the housing can have at least one feed opening for the polymers to be processed in the extruder as well as optionally one or more supply openings for additives, accessory substances and/or auxiliary substances. It is convenient for there to be at least one vent, to which for example a vacuum can be applied in order to extract volatile constituents from the production process. At least some regions of the housing can be heated and/or cooled in order to influence the temperature of the polymer. In addition or alternatively it is possible to provide a screw itself with a flow mechanism for a heat-exchange fluid. The extruder can thus comprise one or more temperature zones. The extruder preferably has a plurality of different temperature zones, the temperature of same being mutually independently adjustable. Suitable extruders are commercially available.

In order to arrive at the modified olefin copolymers which are suitable according to the invention, these starting polymers are subjected to thermomechanical degradation. The thermomechanical degradation of a polypropylene (co)polymer can take place in a first extrusion section under shear stress. Furthermore, the molecular weight of the polymer can additionally be degraded by heat. It is moreover possible additionally to add radically decomposing initiators to control the degradation reaction. If additives and auxiliary substances are to be added, they can be produced in a second process section by the addition and mixing of at least one additive under shear stress. The first and second extrusion sections can be connected here in such a way that above its softening point the modified olefin copolymer is transferred from the first to the second extrusion section. In another embodiment the modified olefin copolymer is melted in a separate mixing step and mixed with the additives. These mixing processes can also be performed in a heated compounder, for example.

A method for producing a suitable hot-melt adhesive using extruders, wherein the adhesive is to contain at least one modified olefin copolymer and optionally at least one further additive, can be performed by i) feeding a high-molecular-weight starting polymer into a first extrusion section with subsequent thermomechanical degradation of the starting polymer in the first extrusion section under shear stress to produce a modified olefin copolymer, the temperature of at least one region of the first extrusion section being above the softening point of the starting polymer; ii) optionally transferring the modified olefin copolymer from the first extrusion section to a second mixing step, while iii) admixing at least one additive in the second mixing step and subsequently mixing with the modified olefin copolymer under shear stress to produce the adhesive. The melt viscosity of the modified olefin copolymer after the degradation step, determined at 200° C., is preferably less than 20,000 mPas, in particular below 10,000 mPas (Brookfield Cap 2000+, cone 8, 200° C., DIN ISO 2555). In a preferred embodiment the second mixing step is performed immediately after the first step in an extruder. If the modified olefin copolymers already have suitable adhesive properties, the addition of additives and the corresponding mixing step can also be omitted.

To increase the efficiency of the manufacturing method it is advantageous in particular if the thermomechanical degradation in step i) of the production method is performed in the presence of at least one radical former.

Suitable radical formers are for example compounds containing peroxo or diazo groups, peroxides, in particular organic peroxides, being preferred. Examples are (2,5-dimethyl-2,5-di-[tert-butylperoxyl]hexane), di-tert-amyl peroxide, dicumyl peroxide, di-tert-butyl peroxide, 2,5-dimethyl-2,5-di(tert-butyl peroxy)-3-hexyne, benzoyl peroxide, p-chlorobenzoyl peroxide, 2,4-dichlorobenzoyl peroxide, tert-butyl peroxybenzoate, diacetyl peroxide and lauroyl peroxide; such products are available commercially. Within the context of production it is advantageous for the radical former to be added in an amount from 0.02 to 5 wt. %, preferably from 0.05 to 3 wt. % and in particular from 0.1 to 2 wt. %, relative to the total amount of polypropylene (co)polymer.

With the specified amount of radical formers, in particular peroxide, the thermomechanical degradation process can be performed at a temperature from 100° C. to 350° C., preferably from 140° C. to 300° C., wherein relatively short residence times in the first extrusion section of 0.1 min to 3 min can be achieved. On completion of degradation the proportion of radical formers should be low, in order for the polymers obtained to undergo further processing in a stable state.

The modified olefin copolymers can also additionally contain functional groups. These can also improve adhesion to the substrates. They can be SH groups, OH groups, ester groups and/or COOH or cyclic anhydride groups.

The method according to the invention is characterized by a high process efficiency and low energy requirement, making it advantageous from environmental perspectives. Furthermore, the hot-melt adhesives obtained generally have improved properties in comparison to conventionally produced adhesives, in particular with regard to viscosity, adhesion and/or cohesion.

The adhesives that are suitable according to the invention are hot-melt adhesives. These are solid at temperatures below 70° C., i.e. the softening point (ring/ball, ASTM D 3461) is above 70° C., but they can be applied to the parts to be adhesively bonded as a melt and set on cooling. It is advantageous to produce hot-melt adhesives by the method described above as they can be obtained directly, without performing an otherwise customary formulation step, which involves a further melting of the polymers.

The weight-average molecular weight (Mw) of the modified olefin copolymer after degradation is significantly reduced. The reduction of the molecular weight as described above causes the viscosity and the processing temperature of the degraded polymer to be lowered. The modified olefin copolymer should particularly preferably have a melt viscosity from 200 to 10,000 mPas (Brookfield, at 200° C.), in particular up to 5000 mPas. In a particular embodiment of the present invention the softening point of the modified olefin copolymer is between 70° C. and 150° C. It is convenient according to the invention if the softening point of the starting (co)polymer to form the modified olefin copolymer is reduced by more than 10° C., for example also by more than 30° C., during degradation.

A hot-melt adhesive that is suitable according to the invention can moreover optionally contain known additives and auxiliary substances. These can be tackifying resins, stabilizers, crosslinking agents, pigments, fillers, antioxidants, adhesion promoters, plasticizers or elastomers. The amount of additives can be up to 10 wt. %, in particular 0 to 5 wt. %. The application properties of the adhesive can also be influenced by the additives. It is important to ensure compatibility with the modified olefin copolymer. In the choice of additives care should be taken not to increase the adhesion too greatly. Thus in a preferred embodiment it is preferable for the adhesive to contain no resins and/or no waxes.

A suitable composition of the hot-melt adhesive that is suitable according to the invention contains from 80 to 100 wt. % of the modified olefin copolymer and from 20 to 0 wt. % of additives and auxiliary substances, the sum adding to 100%. A preferred composition contains 0.2 to 10 wt. % of additives and 90 wt. % and more of one or more modified olefin copolymers. The viscosity of the adhesive should preferably be up to 20,000 mPas.

The hot-melt adhesives that are suitable for the method according to the invention have a low viscosity. The hot-melt adhesives preferably have a viscosity from 200 mPas to 10,000 mPas, particularly preferably up to 5000 mPas (at 200° C.). The softening point is 70 to 150° C., preferably 80 to 140° C. The hot-melt adhesives that are suitable according to the invention should be elastic. Under tensile stress they should not break but instead should demonstrate elastic strain. This is understood to mean that the adhesive preferably has an ultimate elongation of more than 10% (measured in accordance with DIN ISO 527-1, at 23° C.), in particular more than 50%.

The ultimate elongation in accordance with DIN ISO 527-1 can be measured by pouring the sample, which has first been melted at 210° C. in a circulating-air oven, onto Teflon film in a metal frame to produce bubble-free sheets of approx. 3 mm in thickness. After storing for 24 h in a climatic chamber at 23° C., 50% humidity, specimens are punched out using a 5A die and an unheated press. Perfect specimens (sharp edges, no burrs, smooth surface) are selected. The test pieces produced are tested for their tensile properties using a TIRAtest 27025—at 23° C., 50% humidity. Distance between clamps at the start of the test: 50 mm, test rate: 100 mm/min. Five test pieces per sample are measured and then the average of the results is calculated by standard deviation.

The hot-melt adhesives are used in particular for producing protective elements on various sensitive substrates, for example ceramic objects. To this end the adhesive is melted in suitable devices and applied to predetermined regions of the objects as a melt. These regions and surfaces are chosen such that the purpose of the coating as a spacer in respect of other optionally similar objects is met. These are outer surfaces which can come into contact with other objects or means of transport. The surface to be coated can be of any shape, for example a circular area, rectangle, ring, other shapes or irregular network shapes. They can be straight or curved regions, and edges can also be coated. The size of the regions is chosen such that an adequate protective function is provided. The shape and design are also dependent on the objects. The applied hot-melt adhesive sets and forms a molding.

To achieve the adequate protective function, the protective element should preferably have a thickness of over 0.5 mm, but layers from 5 to 20 mm can also be applied. In the form of a molding or a layer the protective element particularly preferably has a thickness from 0.5 to 20 mm. In the case of a layer the layer is preferably applied directly in a thickness from 5 to 20 mm. These individual adhesive components each form a molding within the meaning of the invention. The molding can have a geometrical shape or be irregular in shape.

Objects made from other materials can also be coated. Examples are coated chipboard, objects with plastic surfaces, metal substrates or other composite bodies.

The hot-melt adhesive that is suitable according to the invention adheres to the surfaces of the substrates if it is applied as a melt. It does not have pressure-sensitive adhesive properties. This ensures that the protective layer is fixed to the predefined location. According to an embodiment of the invention a second object is added during the open time of the adhesive. In this case adhesive bonding to the second substrate is also possible. If the second substrate is brought into contact with the protective layer at a later time, this side is no longer adhesively bonded. However, if this contact is made during a phase in which the adhesive molding is still not fully set on the inside, the molding can also adapt to the surface shape of the other substrate.

A protective element or molding designed according to the invention is elastic. The ultimate elongation is preferably over 10%, particularly preferably over 20%. Through the selected composition it is moreover possible for the adhesion to the substrates to be preferably less than 1 N/mm. This enables the layer to be mechanically removed again from the substrates. The elasticity of the element means that it tears only with difficulty, so it can be readily detached from the substrate. No residue of the adhesive remains on the surfaces, so there is no impairment to the substrates. An adhesive failure in respect of the substrate is thus established.

In a particularly preferred embodiment a protective layer is applied to stackable objects. Here the hot-melt adhesive is applied directly to the predetermined regions of the surface following production of the objects. The adhesive hardens quickly, and a further substrate can then be stacked immediately on the substrate coated in this way. The adhesion to the surfaces ensures that the protective elements do not slip during transport. The low adhesion allows the objects to be easily separated from one another. The protective element can then be readily removed from the other substrate. It can be seen that the hot-melt adhesive detaches completely from the substrate surface. No residues or impurities can be discerned. The good application at low viscosity and the rapid set means that objects can be stacked and packed quickly.

EXAMPLES

Polymer 1

A high-molecular-weight C3/C2 copolymer (Dow) (MFR 25 g/10 min/2.16 kg 230° C.; softening point 154° C.) is mixed with 1.5% peroxide in an extruder at 280° C. for approx. 2 to 3 min and degraded.

The modified PP/PE copolymer that is formed has a viscosity of 1160 mPas at 200° C. and a softening point of 134° C.

Polymer 2

A high-molecular-weight C3/C4 copolymer (LyondelBasell) (MFR 0.8 g/10 min/2.16 kg 230° C.; softening point 118° C.) is mixed with 0.3% peroxide in an extruder at 280° C. for approx. 2 to 3 min and degraded.

The modified olefin copolymer that is formed has a viscosity of 1330 mPas at 200° C. and a softening point of 106° C.

Polymer 3

A mixture of a C3-based terpolymer (Ineos, MFR 5 at 230° C., 2.16 kg) (30 parts) with a C2/C3 copolymer (ExxonMobil, MFI 3.6 at 190° C., 2.16 kg) (70 parts) is processed with 1.25% peroxide in an extruder at 300° C. for 2 to 3 min and degraded.

The polymer blend that is formed has a viscosity of 800 mPas at 200° C., a softening point of 130° C. and an ultimate elongation of 35.0%.

Comparison 4

A polyamide hot-melt adhesive (Huntsman) (softening point 123° C.) with a viscosity of 380 mPas at 200° C. is used directly.

Comparison 5

A commercial hot-melt adhesive consisting of 40% C2/C8 copolymer, 40% of a resin and 20% additives (softening point 110° C., viscosity 840 mPas at 180° C.) is used.

The adhesive are melted at 180° C. and then applied to a test substrate (surface of a roofing tile). After 5 min a second identical substrate is placed on top. After 24 hours the covering substrates were removed and the adhesion to the base was determined.

Results (storage at 25° C.)

| Substrate | Test 1 | T2 | T3 | T4 | T5 |
|---|---|---|---|---|---|
| Back of tile | 1, 3, 5 | 1, 3, 5 | 1, 3, 5 | 2, 3 | 1, 4 |
| Tile, brown painted | 1, 3, 5 | 1, 3, 5 | 1, 3, 5 | 2, 3, 6, | 1, 4, 7, |
| Tile, reddish-brown matt | 1, 3, 5 | 1, 3, 5 | 1, 3, 5 | 1, 4, 7, | 1, 3, 6, |
| Chipboard, white coated | 1, 3, 5 | 1, 3, 5 | 1, 3, 5 | 1, 4, 7, | 1, 4, 7, |
| Chipboard, black painted | 1, 3, 5 | 1, 3, 5 | | 1, 4, 7, | |
| Chipboard, black textured | 1, 3, 5 | 1, 3, 5 | 1, 3, 5 | | 1, 4, 7 |
| HPL laminated chipboard | 1, 3, 5 | 1, 3, 5 | | 1, 4, 7, | 1, 4, 7 |

1: Adhesion to substrate good
2: No adhesion
3: Can be easily detached from substrate, no tearing
4: Difficult to detach
5: No residue
6: Very little residue
7: Significant residue Results (storage at 50° C.)

| Substrate | Test 1 | T2 | T4 | T5 |
|---|---|---|---|---|
| Back of tile | 1, 3, 5 | 1, 3, 5 | 1, 3, 5 | 1, 4, 7 |
| Tile, brown painted | 1, 3, 5 | 1, 3, 5 | 1, 4, 7, | 1, 3, 6, |
| Tile, light brown matt | 1, 3, 5 | 1, 3, 5 | 1, 4, 7, | 1, 3, 6, |
| Chipboard, white coated | 1, 3, 5 | 1, 3, 5 | 1, 4, 7, | 1, 4, 7, |
| Chipboard, black textured | 1, 3, 6 | 1, 3, 5 | | 1, 4, 7 |
| HPL laminated chipboard | 1, 3, 6 | 1, 3, 5 | 1, 4, 7 | 1, 4, 7 |

The polyamide adhesive and the adhesive produced directly with a commercial, non-degraded polyolefin exhibit inferior adhesion and residue values. The best results after visual assessment were obtained overall with mixture 3.

Adhesives 1, 2 and 5 are applied (200 μm) with a squeegee to a polyolefin film, covered with a piece of coated chipboard and adhesively bonded. The samples are stored at room temperature and tested after 24 hours.

Strips measuring 20×200 mm were cut out and the adhesive force (90° C., 10 mm/min) was measured.

T1: Adhesive failure in respect of substrate, force <1 N/mm
T2: Adhesive failure in respect of substrate, force <1 N/mm
T3: High adhesion to surface, adhesive failure between film and adhesive

The invention claimed is:

1. A protective coating element prepared from a hot-melt adhesive comprising:
   (a) greater than 80 wt. % of at least one modified polyolefin copolymer produced by thermomechanically degrading a high-molecular-weight polyolefin copolymer under shear stress and/or heating, whereby the viscosity of the copolymer is reduced, and
   (b) up to 20 wt. % of an additive and auxiliary;
   wherein the adhesive has a softening point from 70 to 150° C.

2. The protective coating element according to claim 1, characterized in that the hot-melt adhesive has a viscosity from 200 to 10,000 mPas at 200° C.

3. The protective coating element according to claim 1, characterized in that the polyolefin copolymer is selected from propylene/ethylene copolymers, propylene/butylene copolymers, ethylene/butylene copolymers or a corresponding terpolymer having an MFI of below 50 g/10 min (230° C., 2.16 kg).

4. The protective coating element according to claims 1, characterized in that the adhesive has an ultimate elongation value of greater than 10% and the adhesive has a force value of less than 1 N/mm.

5. The protective coating element according to claim 1, characterized in that the adhesive comprises less than 10 wt. % of additives and auxiliary substances, selected from resins, adhesion promoters or wax.

6. An object comprising a substrate and a protective coating element produced from a hot-melt adhesive comprising (a) greater than 80 wt. % of at least one modified polyolefin copolymer produced by thermomechanically degrading a high-molecular-weight polyolefin copolymer under shear stress and/or heating, and (b) up to 20 wt. % of an additive and auxiliary,
   wherein the adhesive has an adhesion value below 1 N/mm.

7. The object according to claim 6, wherein the protective coating element can be removed from the substrate without any residue.

8. A method for coating an object with a protective coating element comprising the steps of:
   (a) preparing a melt of the protective coating elements by (i) thermomechanically degrading a high-molecular-weight polyolefin copolymer under shear stress and/or heating and (ii) combining up to 20 wt % of an additive and auxiliary to the copolymer;
   (b) applying the melt onto a substrate at a temperature from 80 to 150° C.; and
   (c) cooling the melt.

9. The object of claim 6, wherein protective coating element has a thickness of from 0.5 to 20 mm.

* * * * *